(No Model.)
W. S. RUNYON.
CORN CULTIVATOR ATTACHMENT.
No. 554,735. Patented Feb. 18, 1896.
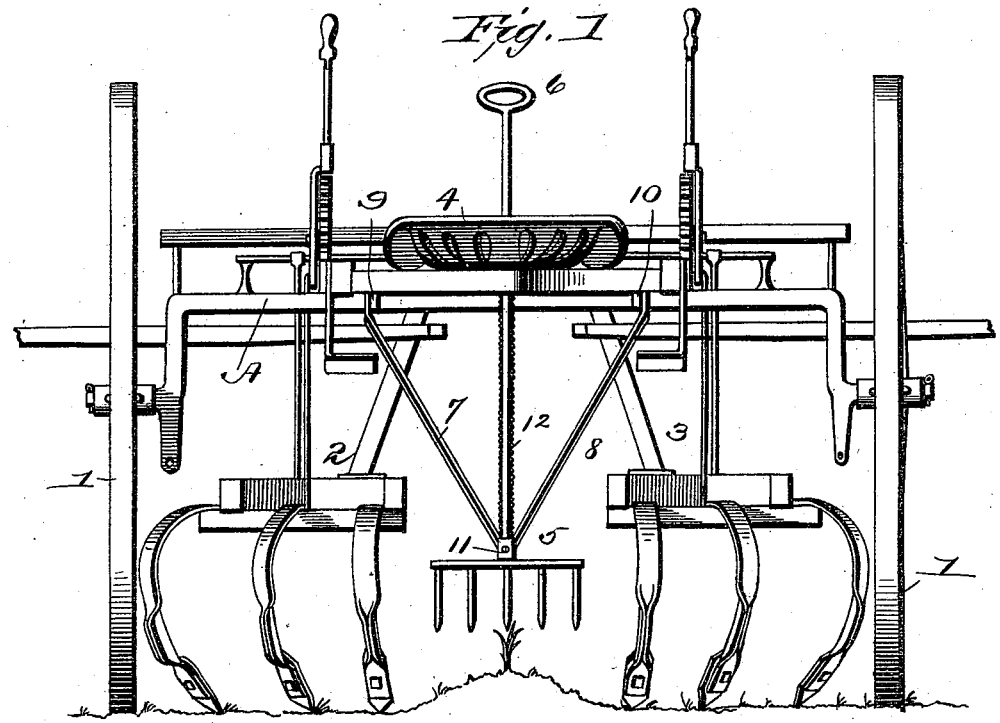
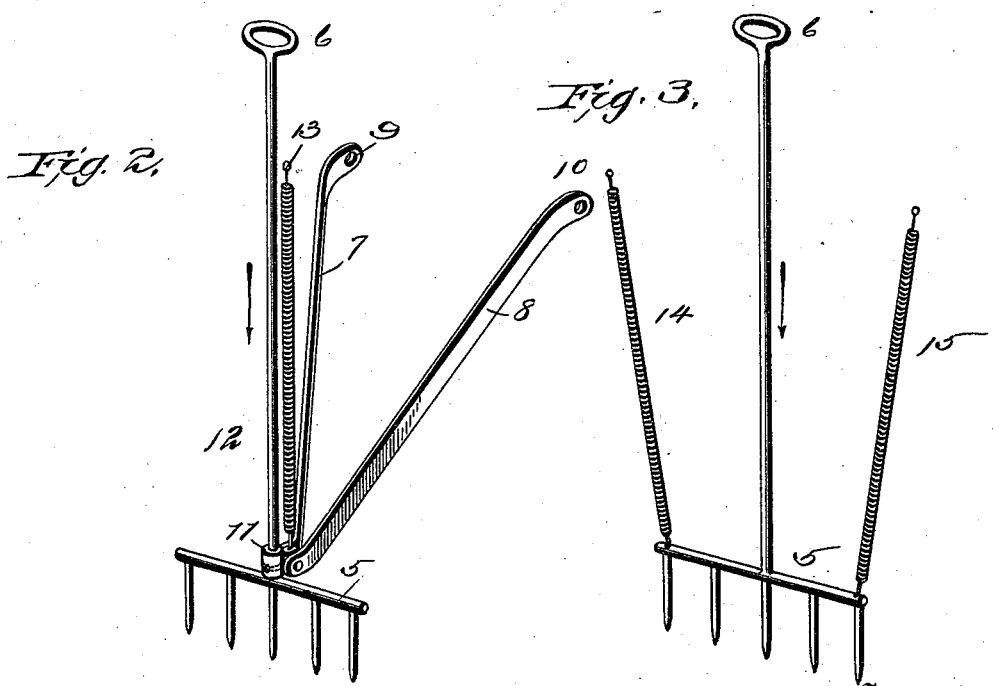
Witnesses
Geo. R. Hamlin
Inventor:
William S. Runyon
per Rhesa Du Bois
Attorney.

UNITED STATES PATENT OFFICE.

WILLIAM S. RUNYON, OF LEXINGTON, IOWA.

CORN-CULTIVATOR ATTACHMENT.

SPECIFICATION forming part of Letters Patent No. 554,735, dated February 18, 1896.

Application filed April 10, 1895. Serial No. 545,226. (No model.)

*To all whom it may concern:*

Be it known that I, WILLIAM S. RUNYON, a citizen of the United States, residing at Lexington, in the county of Washington and State of Iowa, have invented certain new and useful Improvements in Corn-Cultivator Attachments; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to those corn-cultivator attachments which are designed to remove the clods of dirt thrown on the young and growing plants by the action of the cultivator-teeth or harrow devices when the soil around the plants is being cultivated. Clod-fenders are commonly used to prevent the loose dirt from being thrown on the growing plants; but despite their use the plants are often covered by the dirt and destroyed unless the operator should stop and remove the dirt. Clod-removers adapted to be attached to the foot of the operator of a cultivator have also been used for this purpose, and my invention is designed to improve on such devices.

The object of my invention is to provide a cheaper, more simple and easier-operated and efficient clod-remover which may be attached without trouble to any cultivator-machine.

With these objects in view my invention consists in a spade, rake or fork which may be operated by the driver of the machine, together with steadying and sustaining devices whereby the said spade, rake, or fork may be attached to the cultivator and manipulated.

In the accompanying drawings, Figure 1 represents a rear view of a cultivator, showing my clod-remover applied; Fig. 2, a detail view of the device shown in the preceding figure, and Fig. 3 a detail view of a modification.

A represents the axle of a corn-cultivator, and this axle is mounted in traction-wheels 1. The usual cultivating devices are shown at 2 and 3, respectively, while 4 represents the driver's seat.

At 5 is shown a fork or rake of any desired construction, this fork or rake being disposed between and back of the respective cultivating devices 2 and 3. A handle 6, connected to the fork in the usual manner, extends upward in front of the seat 4 to lie just between the legs of the driver of the machine so it can be readily grasped.

At 7 and 8 are shown connecting-rods which are respectively attached at 9 and 10 to the axle A of the cultivator, and these rods are also connected by a collar, as shown at 11, to the head of the fork 5. A coil-spring 12 is attached at 13 to the driver's seat and also connects with the head of the fork 5. This coil-spring is of such length and tension that it will support the fork, handle, and rods so as to allow the tines of the said fork to clear the surface of the ground by a very few inches, Fig. 1.

In Fig. 3 is shown a modification of the above construction. In the place of the connecting-rods 7 and 8 I employ coil-springs 14 and 15, and dispense entirely with the spring 12, as the springs 14 and 15 serve a double purpose—viz., that of sustaining the fork and handle and of connecting the fork to the machine.

The extreme forward cultivating shovels or teeth are the ones which tend to throw clods of dirt on the corn and cover it, as they are nearer the row than the shovels that follow, and I employ my device to remove these clods in a manner which will now be described.

As the cultivator advances and the driver discovers that a plant has been covered, he depresses the handle, which is commonly grasped by the left hand, so as to strike the ground just to the rear of the clod. Then a quick upward jerk and the forward movement of the cultivator raises and throws the clod over and in front of the uncovered plant.

It is obvious that many of the details of my invention may be varied. Hence I do not confine myself to the construction herein shown, but consider myself entitled to all such variations as come within the spirit and scope of my invention.

Having thus described my invention, what I claim as new, and desire to secure by Letters Patent, is—

1. In combination with a cultivator, a depressible rake or fork suspended from the cultivator by a spring and normally out of contact with the surface of the ground over which the cultivator passes, substantially as described.

2. In combination with a cultivator, a rake or fork suspended from the cultivator by a spring, and normally out of contact with the surface of the ground, and a handle for depressing and operating the said rake or fork, substantially as described.

3. In combination with a cultivator, a clod-remover attachment comprising the combination of a rake or fork, a rod connecting the rake or fork to the cultivator-body, an independent spring-suspending device for holding the rake or fork normally suspended so that it will clear the surface of the ground over which the cultivator passes, and a handle whereby the said fork may be depressed and manipulated against the retractive action of the spring-suspending device to bring it in contact with a clod of dirt, substantially as described.

In witness whereof I affix my signature in presence of two witnesses.

WILLIAM S. RUNYON.

Witnesses:
DANIEL WILDE,
A. A. RODMAN.